US008074168B2

(12) United States Patent
Zingher et al.

(10) Patent No.: US 8,074,168 B2
(45) Date of Patent: Dec. 6, 2011

(54) AUTOMATED CONTEXT-COMPENSATED RENDERING OF TEXT IN A GRAPHICAL ENVIRONMENT

(75) Inventors: Arthur R. Zingher, Mountain View, CA (US); Hideya Kawahara, Mountain View, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1578 days.

(21) Appl. No.: 11/449,917

(22) Filed: Jun. 9, 2006

(65) Prior Publication Data

US 2007/0288844 A1  Dec. 13, 2007

(51) Int. Cl.
*G06F 17/00* (2006.01)
(52) U.S. Cl. ........................................ 715/243; 715/256
(58) Field of Classification Search .................. 715/273, 715/256, 243; 345/419
See application file for complete search history.

(56) References Cited

U.S. PATENT DOCUMENTS

| 5,754,242 | A  | * | 5/1998  | Ohkami ......................... 348/441 |
| 5,870,097 | A  | * | 2/1999  | Snyder et al. ................. 345/426 |
| 6,057,858 | A  | * | 5/2000  | Desrosiers ..................... 345/467 |
| 6,584,479 | B2 | * | 6/2003  | Chang et al. ................... 715/205 |
| 7,009,611 | B2 | * | 3/2006  | Di Lelle ......................... 345/467 |
| 7,301,672 | B2 | * | 11/2007 | Abe et al. ........................ 358/1.9 |
| 2002/0081030 | A1 | * | 6/2002  | Slavin ........................... 382/192 |
| 2002/0154122 | A1 | * | 10/2002 | Di Lelle ......................... 345/467 |
| 2005/0117215 | A1 | * | 6/2005  | Lange ............................ 359/462 |
| 2006/0047704 | A1 | * | 3/2006  | Gopalakrishnan ......... 707/104.1 |

OTHER PUBLICATIONS

Preim et al.,"Coherent Zooming of Illustrations with 3D-Graphics and Text", Google Scholar, 1997, pp. 1-9.*
Lewis etal.,"ActiveText: A Method for Creating Dynamic and in teractive Texts", ACM, 1999, pp. 131-140.*

* cited by examiner

*Primary Examiner* — Laurie Ries
(74) *Attorney, Agent, or Firm* — Park, Vaughan, Fleming & Dowler LLP; Mark Spiller (57) ABSTRACT

The disclosed embodiments automate context-compensated rendering of text in a graphical environment. In the disclosed embodiments, the system first receives a specification of the graphical environment that includes text to be rendered in the graphical environment. Next, the system determines the parameters of the local environment near the text (e.g., character size and perturbations for perspective and tilt, pixel density, adjacent (local or background) color and brightness, illumination and shadow effects, etc.). The system then dynamically renders text to compensate for those parameters, in order to display the text more clearly.

21 Claims, 4 Drawing Sheets

AUTOMATED CONTEXT-COMPENSATED RENDERING OF TEXT IN A GRAPHICAL ENVIRONMENT

BACKGROUND

1. Field of the Invention

The present invention relates to the display of text in a virtual graphical environment. More specifically, the present invention relates to a method and an apparatus for automated context-compensated rendering of text in a virtual graphical environment. This is particularly useful for text compatible with virtual 3D displays, and with a disparate range of displays.

2. Related Art

Modern computer display technology increasingly provides support for rendering objects in virtual graphical environments, particularly virtual three-dimensional (3D) graphical environments, such as isometric images. These incorporate many more dynamic graphical effects than traditional two-dimensional graphical environments. However, these effects can have a negative impact on the clear display of text. Existing systems that support virtual graphical environments typically render text using static font images with one or more parameters that do not change according to the graphical environment. For example, two-dimensional fonts are typically based on a fixed map and one or more parameters, such as point-size, style, and color. These do not depend on the graphical environment in which the character will be displayed. Therefore the rendered text often may have poor visibility in the graphical environment.

In the prior art, a skillful artist can manually create an illustration, including 3D-like isometric objects, text and lighting effects. A skillful artist may modify the appearance of the text to provide appropriate readability and graphical compatibility with the remainder of the illustration. However, the success of such changes depends upon the skill of the artist. In partly-automated illustrations, such modifications are not automatically provided, and may or may not be achieved by manual human intervention.

During the European Renaissance, talented artists and scientists created "perspective rules" describing how the painting of an object should vary with its apparent location (especially depth) in the graphical environment (such as a landscape). While such rules can be used to display computer-generated images, these rules do not provide for a clear display of text.

In highly-automated illustration techniques, the appearance of text often suffers from poor readability against the graphical context. A common example of this problem is a movie with subtitles. Typically the subtitles are rendered with a fixed graphical style, and these are superimposed on scenes with various graphical properties, such as brightness and color. In some scenes, the subtitles are clearly readable, but in others the subtitles are difficult to read.

Another problem is type-font poor compatibility across disparate displays. Some type-fonts are optimal for low-resolution monochrome (black and white) displays, and others are optimal for high-resolution polychrome (color) displays. A single type-font is typically not optimal across disparate displays, which presents problems for an image on a centralized server computer that is downloaded to disparate client computers and viewed on disparate displays. As a result, customizing an image on a server for a specific client involves notifying the server of client display parameters and the server creating a customized image that is then downloaded and displayed on the client. This approach can significantly increase server load.

Hence, what is needed is a method and an apparatus for rendering text more clearly in a graphical environment, without the limitations of existing systems.

SUMMARY

One embodiment of the present invention provides a system for context-compensated automated rendering of text in a graphical environment. First, the system receives a specification of the graphical environment and text to be rendered in the graphical environment. Next, the system determines the parameters of the local graphical environment graphically near the text. Then, the system dynamically modifies the display of the text based on those parameters in order to display the text more clearly.

In a variation on this embodiment, the set of parameters for the local environment can include: (1) the size, resolution, and/or level-of-detail of the text to be rendered, (2) the size, resolution, and/or level-of-detail of the local environment, (3) perspective magnification, tilting, and fog effects related to distance and viewpoint; (4) variations in brightness, color, hue, saturation, virtual lighting, and/or virtual reflectivity related to a set of displayed objects and virtual lighting; and/or (5) shadows, texture, scattering, absorption, reflections, and/or other effects related to interactions between the set of displayed objects and virtual lighting.

In a further variation, the system dynamically modifies the rendering of the text by: modifying one or more parameters for the local environment, modifying one or more parameters for the text, changing a typeface for the text; changing a color for the text based on the appearance of a surface near the text; and/or moving or tilting the text.

In a further variation, the specification includes an enhanced type-font for the text. This enhanced type-font allows designers to specify a set of type-fonts, font rendering parameters, and/or visual alteration rules in response to different values of parameters in the local graphical environment.

In a further variation, the system is implemented using software, firmware, multi-purpose hardware, semi-specialized hardware, and/or fully-specialized hardware.

In a further variation, the system changes the typeface of the text to a simpler or more detailed typeface.

In a further variation, in order to change a typeface to a simpler typeface, the system omits detail; replaces portions of the text by a simplified approximation; renders plural character in the text differently from individually-rendered characters in the text; and/or graphically emphasizes the most-significant features of the text.

In a further variation, the system changes the color of the text to make the text more readable against the colors of the local graphical environment.

In a further variation, the system changes the rendered text by varying the color, brightness, or hue of a border or edge of the text to distinguish the text from the local graphical environment.

In a variation on this embodiment, the system represents each character as an object and set of associated transformation techniques instead of a fixed map, thereby changing the character rendering process.

DETAILED DESCRIPTION

The following description is presented to enable any person skilled in the relevant art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), and includes electronic or magnetic memory or storage IC chips such as DRAM, MRAM, or flash memory, or any device capable of storing data or program usable by a computer system.

Also, the data structures, instructions, and computer functions described by this detailed description may be embodied by a general-purpose CPU, semi-specialized hardware, and/or specialized hardware. Likewise, the computational devices can be controlled by software, firmware or hardware. For example, one embodiment includes a general-purpose CPU and a software program. A second embodiment includes a video/graphics card with a firmware program. A third embodiment includes a graphics-processing chip with a program in the on-chip hardware. Still other embodiments combine a plurality of such devices.

Rendering Text in a Graphical Environment

Text in graphical environments is traditionally rendered (or displayed) using True-Type fonts and other two-dimensional scalable font automated technologies. Such fonts define characters individually, and typically do not consider any higher-level display issues, such as background color or word context. While rendering a conventional font, a system typically produces a pixel-map, vector-map, or triangle-map based on the character and one or more parameters, such as point-size, style, and color. This conventional rendering process does not depend on the context in which the character will be displayed.

However, recently developed graphical (3-D or isometric) display systems can display substantially more graphical effects than two-dimensional display systems, including:
  Perspective magnification, tilting, and fog effects related to distance and viewpoint;
  Brightness, color, hue, virtual lighting, and virtual reflectivity related to displayed objects and associated virtual lighting; and
  Shadows, reflections, and/or other effects related to interactions among objects and virtual lighting.

Such graphical effects often change dynamically during runtime. For instance, the viewpoint or illumination of a scene may change to reflect input from the user. Since an image designer may not be able to predict the text appearance and clarity displayed to the user, the resulting clarity and quality of the text display may be degraded.

The present invention provides a novel text-rendering system for displaying text in graphical environments such as virtual 3-D space, even with dynamic graphic effects, such as perspective and lighting. The system teaches novel automatic techniques for text-rendering techniques to compensate for local graphical context. For virtual 3-D graphics in particular, the local context defines parameters such as magnification, tilt and inclination, and adjacent brightness. In one embodiment of the present invention, these context parameters are inputs into a subsystem for text rendering within the system. This subsystem treats each character as an object, with an associated set of display techniques and/or parameters, instead of as the fixed map typically used by a two-dimensional character generator.

Figure 1:
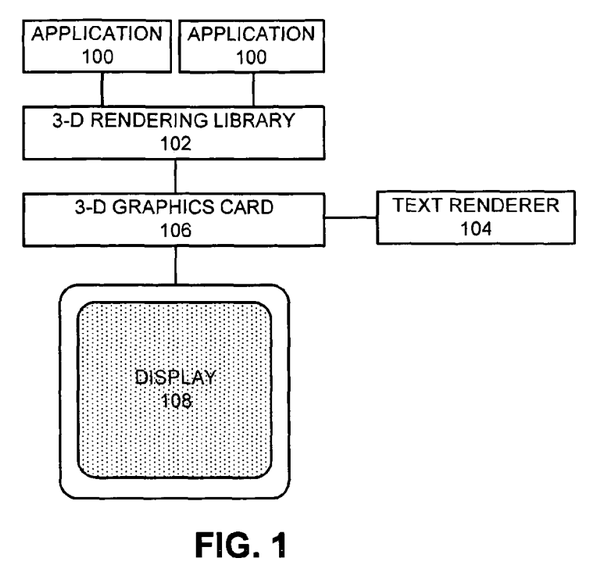
FIG. 1 illustrates a 3-D display system that supports context-compensated text in accordance with an embodiment of the present invention.

FIG. 1 illustrates a 3-D display system that supports context-compensated automated rendering of text. As is illustrated in FIG. 1, a set of applications 100 make requests to a 3-D rendering library 102 to display text in a 3-D environment. The 3-D rendering library 102 determines the local environment surrounding the text to be displayed, and adjusts the text or the local environment accordingly. The 3-D rendering library 102 presents the text description to the 3-D graphics card 106, which in one embodiment of the present invention includes a text renderer 104 that understands how the text display will look, and which performs any potential context-compensation. At the end of the process, the 3-D graphics card 106 displays the 3-D environment and associated text on the display 108.

Context-Compensated Automated Rendering of Text

According to the prior art of automatic text rendering, to express depth or tilt of text in a virtual 3-D or an isometric graphical environment, a normalized fixed shape is subject to x- and y-magnifications (which might be unequal). One embodiment of the present invention teaches a better technique to express depth or tilt in a 3-D graphical environment, in which rendered text becomes simpler with greater depth, smaller size, and/or coarser resolution, and conversely becomes more detailed with shallower depth, larger size, and/or finer resolution.

An example is a capital 'A' with "serifs," which are small lines at the ends of the capital A. As the display of the character becomes smaller, the system simplifies away the serifs, and displays 'A'. As the character becomes even smaller, the system simplifies the hollow in the 'A' to become a filled triangle.

Eventually, as the rendered text continues to shrink, the system begins to work not only at the level of individual characters, but also simplifies entire words or phrases. For example, this displays a profile, skyline or silhouette that shows mainly the tops or tails of the letters, without the interior detail. At some small size, the system shows details for only the most-significant letters. One example is a heuristic rule: for the first and last letters of a phrase, to show letter extensions which extend far about and below other letters, and to replace the middle letters by a simplified approximation. As a further example, a word is rendered as a silhouette, analogous to the skyline of tall buildings in a major city. At an even smaller size, the system simplifies a sentence or title to show only the most-significant features, in accordance with a heuristic or understanding of language rules.

Figure 2:
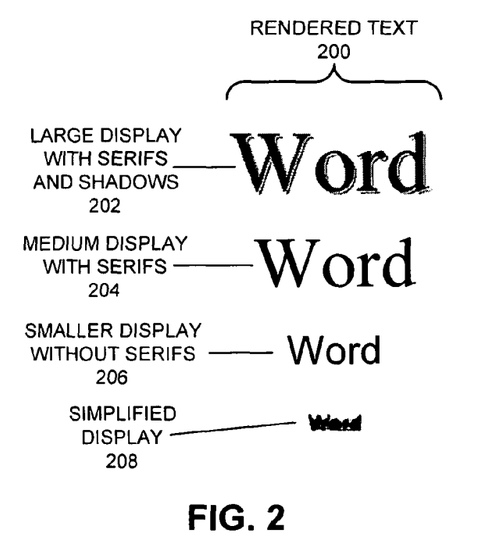
FIG. 2 illustrates the simplification of rendered text with various size reductions, in accordance with an embodiment of the present invention.

FIG. 2 illustrates one embodiment of how rendered text 200 characters and a "Word" are simplified as the system reduces their size. At first, the system displays a large display which includes details such as serifs and shadows 202. As the size of the characters is reduced, the system reduces the rendering to a medium-sized display with serifs 204 (without shadows) and a smaller display without serifs 206, and then eventually replaces the characters with an even smaller and more-simplified display 208. Even when the simplified representation omits many details of component letters, nevertheless correlations between words, prior knowledge, and expectations can reduce the number of possible meanings and can aid human recognition of the word or phrase.

The system can use simplification techniques to change the display of characters based on their depth in the z-dimension. This differs from both classical pixel-defined type fonts and vector-defined type fonts, such as True-Type fonts, which both have almost no simplification as size decreases. Note that a text-rendering technique that works at levels higher than individual letters (e.g. at a word- or phrase-level) is a new concept that changes the data-flow topology for the rendering system.

Figure 3:
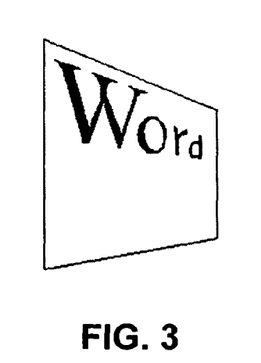
FIG. 3 illustrates compensated text displayed on a slanted plane in accordance with an embodiment of the present invention.

The example in FIG. 2 illustrates a phrase whose characters are magnified or reduced equally and uniformly in the x- and y-dimensions. However, such size reductions are not always equal. In particular, for tilted text, the system may use unequal magnifications in the x- and y-dimensions. To handle such cases, the present invention includes perspective rules for asymmetric magnification. FIG. 3 illustrates compensated text displayed on a slanted plane, where the system has applied a smooth transition using font simplification while also tilting the individual characters so that they can be read clearly.

Color and Brightness Compensation

Text and its background are often colored in 3-D environments. For instance, a perspective display often includes color and brightness non-uniformity (e.g. lighting, shadows, background, and contrast) that effect the visibility of a font. As a result, during the rendering process, the system may need to consider 3-D effects such as z-location, perspective (e.g. slanted text), reflection, shininess of the text, fog, and the virtual material of the 3-D virtual object on which the text is printed. Furthermore, changes in the environment, for instance moving or tilting a panel, can result in changes in appearance.

In one embodiment of the present invention, the system changes the color, brightness, and/or hue of text to maintain contrast despite changes in an adjacent panel or other graphical context. For instance, the system can adjust the font to compensate for changes in graphical context, as well as compensate for changes in size and tilt. If a character appears in a shadow, the system may compensate the brightness of the character to maintain contrast. For example, if a character appears against a blue background, the system can modify the color, brightness, hue and/or border of the text to contrast with blue background. In this way, the system can adjust the character appearance to compensate for the graphical context.

Figure 4A:
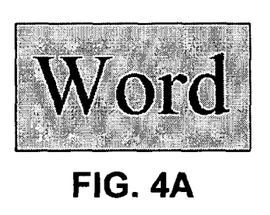
FIG. 4A illustrates a word displayed as black text superimposed on a lighted blue wall in accordance with an embodiment of the present invention.
Figure 4B:
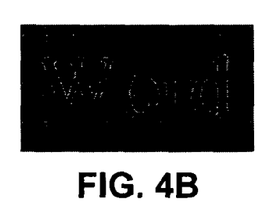
FIG. 4B illustrates a wall that has been darkened as the light source has moved away in accordance with an embodiment of the present invention. The resulting darkness degrades the readability of the black text, and illustrates the need for this invention.
Figure 4C:
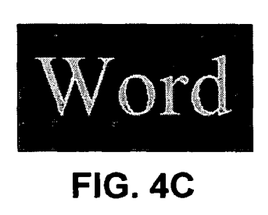
FIG. 4C illustrates text that has been color-modified to improve visibility to compensate for the darkened wall, in accordance with an embodiment of the present invention.

FIGS. 4A-C illustrate color compensation of text. In FIG. 4A, a word is displayed as black text superimposed on a lighted wall, and thus is easy to read. In FIG. 4B, as the light source is moved away, the wall color becomes darker, and the word becomes more difficult to read. The system detects this change in the text visibility, and, as a result, compensates the color of the text to a grey tone (shown in FIG. 4C) that is easier to read.

Figure 5A:
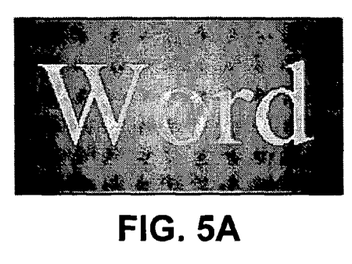
FIG. 5A illustrates a bright-spot or spotlight effect that makes a word difficult to read in the absence of the present invention.
Figure 5B:
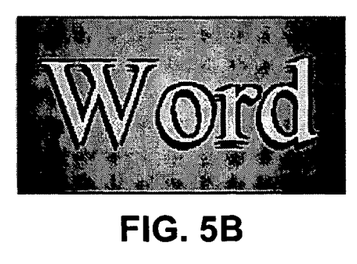
FIG. 5B illustrates a dynamic compensation technique that adds a dark border to a word to improve the readability of the word in accordance with an embodiment of the present invention.

FIGS. 5A and 5B illustrate another form of dynamic compensation. FIG. 5A illustrates how a shining effect from a light can make a word difficult to read. As shown in FIG. 5B, the system may respond by detecting such effects and then compensating for them, for instance by adding a border with a different color to the word or the outside border of the word.

Note that the present invention is not dependent on a specific font or any specific transformation. Type-font designers continually design additional new fonts. The present invention provides a general technique that allows the design of fonts that compensate for graphical parameters of the local graphical environment. For example, these parameters may include character size and perturbations for perspective and tilt, pixel density, adjacent (local or background) color and brightness, illumination and shadow effects. In one embodiment, a font designer can express these compensations as transformations upon a basic font design.

Previously, a type-font designer could not provide such compensation. Another embodiment of the present invention provides automatic compensation by the above-described techniques in either the program that render the type-font, or in other software. This embodiment enables the use of prior art type-fonts. In one embodiment, these improvements may be expressed as a novel class of type-fonts, as described below.

To provide compensation as described above, the program for text definition or text rendering includes as an input graphical parameters of the local graphical environment. This input may be the graphical parameters themselves, graphical details of the local graphical environment, and/or graphical details of the overall graphical environment.

In one embodiment, font compensation is performed dynamically, after the local graphical context is known, instead of at design time, when the graphical context is not yet known, thereby automating font compensation in a program for font-rendering or font-definition. As a result, an image designer can automatically achieve predictable readability and clarity of text in spite of unpredictable runtime dynamic variations in graphical context.

Useful compensation may be done for each character individually. Further compensation may also be done for a larger unit, such as a word or phrase. Therefore, an input to the program for text definition or text rendering preferably is a larger unit, beyond just isolated individual letters.

Extended Type-Fonts for Context-Compensated Text

The lines of rendered text 200 in FIG. 2, as displayed by the prior art of type-fonts, would typically be considered as distinct type-fonts: respectively "Times-Roman with Serifs and Shadows," "Times-Roman with Serifs," "Arial," and perhaps "Skyline." Note that in FIG. 2 a different type-size (often measured in "points") is used for each line of rendered text 200.

By contrast, one embodiment of the present invention teaches a new class of type-fonts extended to adapt to graphical context. For instance, depending on a graphical parameter(s) (such as the rendered character size measured in x-pixels and y-pixels), one unified, extended type-font can provide several degrees of simplification versus detail, in correlation with the graphical parameter(s). Thus the lines of rendered text 200 in FIG. 2 together might form an example of a single extended type-font.

Likewise, an extended type-font can depend upon color, hue, or the brightness of the nearby graphical context, and hence render text with modified color, hue, brightness, borders, etc. Using such a unified, extended type-font can provide, for instance, the rendered text shown in FIG. 4A, FIG. 4C and FIG. 5B, and thus prevent the poor readability counter-examples in FIG. 4B and FIG. 5A.

Extended type-fonts provide several important advantages. First, such extended type-fonts enable a single type-font to provide good readability in spite of a wide range of character sizes or other graphic parameters. A unified approach is also conceptually easier than explicitly "splicing together" several distinct type-fonts to provide such readability. Second, such extended type-fonts explicitly invite graphic designers to create type-fonts for artful and unified text rendering across a wide range of graphic parameters. Third, as described below, these concepts and advantages apply to many graphical parameters beyond character size.

Such extended type-fonts can be particularly useful for an image that will be view across a wide range of different display devices. Such devices may range from very-portable, inexpensive, small, and static displays with very low resolution and simple monochrome (black and white), to large, stationary, animated, and expensive displays with very high resolution and high-quality polychrome (color). Therefore, extended type-fonts enable a central server computer to use one enhanced type-font to feed disparate client computers with disparate displays. This advantage may become increasingly advantageous as display technologies continue to proliferate and diverge.

Flow Chart for Rendering Color-Compensated Text

Figure 6:
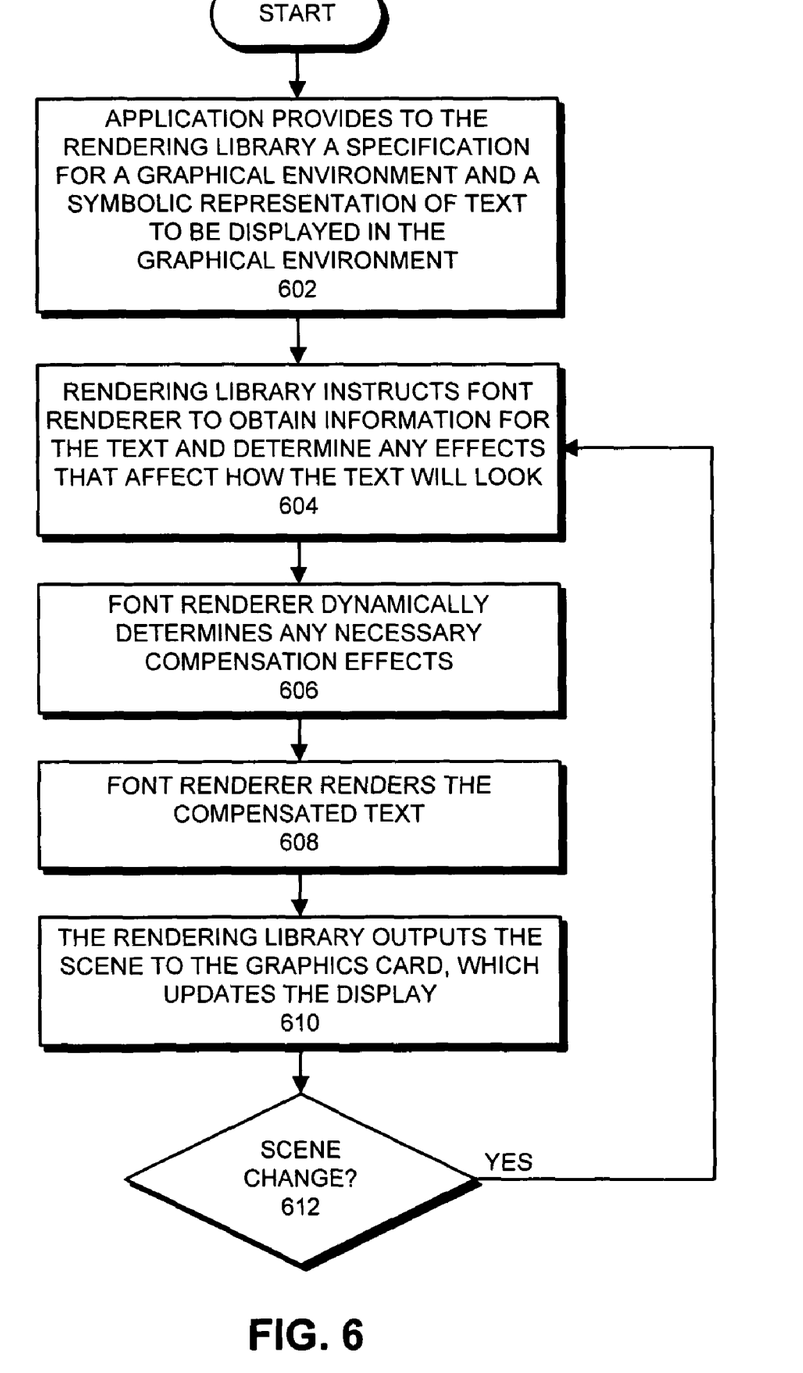
FIG. 6 presents a flow chart illustrating the process of rendering compensated text in accordance with an embodiment of the present invention.

FIG. 6 presents a flow chart illustrating the process of rendering compensated text. First, an application asks the rendering library to render a set of text by providing to the rendering library a specification for a graphical environment and a symbolic representation of the text to be displayed in the graphical environment (step 602). This specification may include plural inputs, for instance the phrase to be rendered, the phrases' location in the image, a detailed description of the graphical environment, and a detailed description of the text style (which can include style bits indicating the name of the type-font, whether the text should be bold or non-bold, and/or compensations for color, brightness, borders, detail, etc.). The 3-D rendering library 102 passes this request to the text renderer 104, which obtains information for the text and determines any effects that might affect how the text will look (step 604), such as any applicable rendering rules, surface angles, background colors, and fog effects. The text renderer 104 then dynamically determines any potential compensation effects (step 606), such as changing the typeface, modifying the type-font's normalized shape, or changing the color of the text or surrounding area. After the text renderer 104 renders the compensated text (step 608), the rendering library 102 outputs the scene to the graphics card 106, which updates the display 108 (step 610). The system repeats the process as needed to dynamically update the rendered text if the scene changes (step 612).

Note that the text renderer 104 can be de-composed into multiple sub-programs. For instance, a first program can take in the location and graphical environment, analyze the graphical environment near the text location, and then output local graphical parameters. A second program could take as inputs the phrase, local graphical parameters, and style bits, and then render the phrase into a bit map, vector list, and/or triangle list, which is then added to the image buffer. Another optional program could apply additional visual effects, such as fog or lighting. In some scenarios, such as multiple reflections, the rendered text might affect the image enough to prompt iterations through the rendering process.

Figure 7:
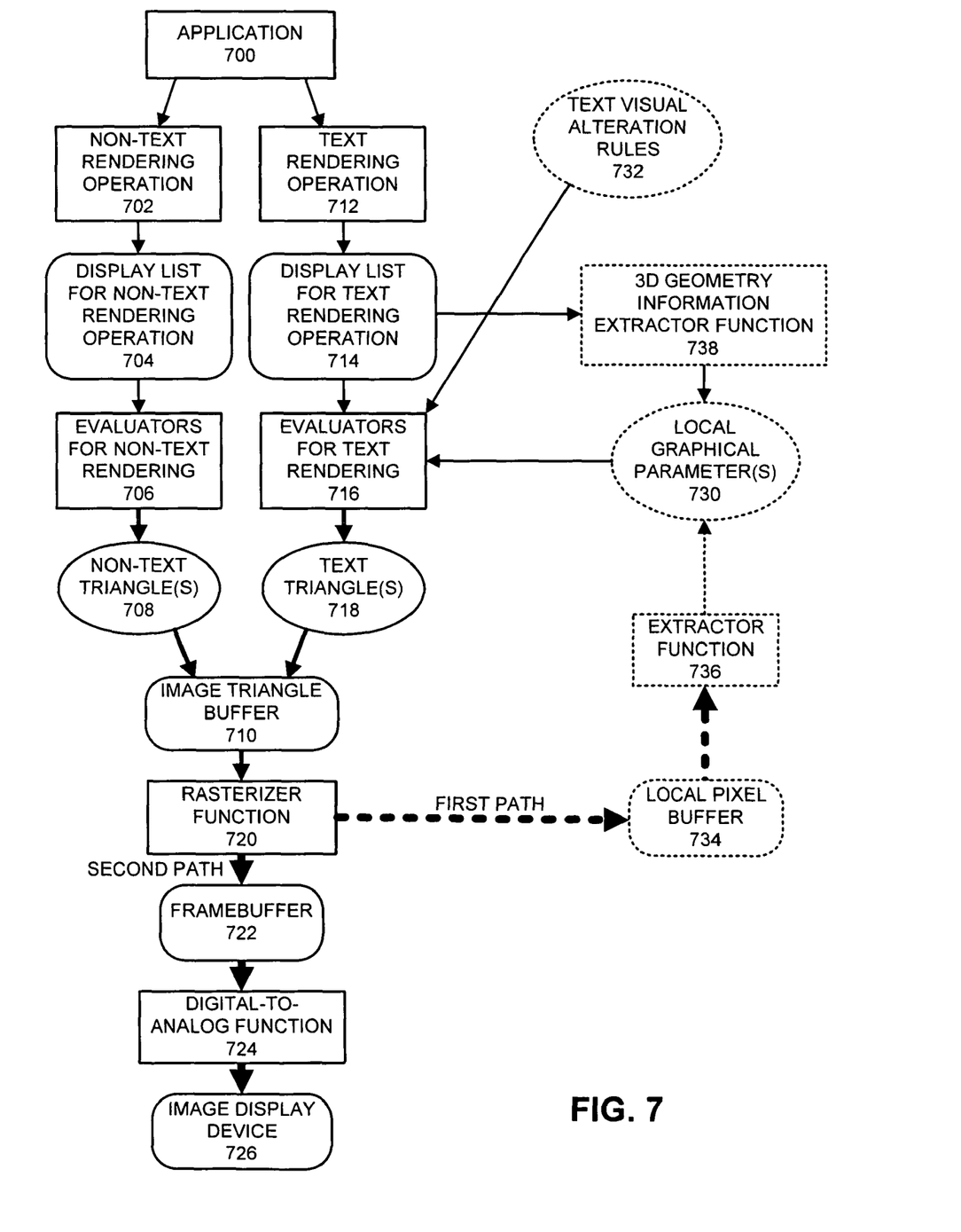
FIG. 7 illustrates the multi-path flow of data during the rendering of compensated text in accordance with an embodiment of the present invention.

FIG. 7 illustrates the multi-path flow of data during the rendering of compensated text in one embodiment of the present invention. In FIG. 7, a sharp-cornered rectangle represents a function that transforms data, a round-corner rectangle represents a data buffer, and an oval represents data in transit. Furthermore, arrows show data flow, with arrow thickness loosely suggesting the average bandwidth. The dotted objects highlight new additions that support text compensation. In one embodiment, graphical triangles are directly used to form an image, rather than using vectors or pixels.

In FIG. 7, an application 700 provides data for an image. For example, an application can include a three-dimensional desktop, a computer game, or a download from a server. For a non-text image component, the application 700 provides an input to a non-text rendering operation 702. This non-text rendering operation 702 creates a display list for the non-text rendering operation 704, which includes a set of geometry and color description information. This display list is fed to evaluator functions for non-text rendering 706. These evaluator functions derive "verticles" (e.g. a set of rectangles) that represent shapes from a higher level representation such as control points. The output of the evaluators is a set of non-text triangle(s) 708, which in turn loads an image triangle buffer 710. The image triangle buffer 710 feeds a rasterizer function 720 that converts both geometric and color information into a set of pixels.

In parallel to the non-text rendering path, for each text image component, the application 700 provides an input to a text rendering operation 712. In one embodiment, this operation operates upon the text as a string of double-byte character symbols (DBCS), in combination with text location and text orientation expressed as x-, y-, and z-coordinates in image virtual space and data that identifies the type-font. The text rendering operation 712 creates a display list for the text rendering operation 714, which is fed to an evaluator function for text rendering 716. Also, the geometry information of the text and applied 3D effects are extracted from the display list 714 by a 3D geometry information extractor function 738 and then added to a set of local graphical parameters 730. The 3D geometry and effects information includes specific text location, z-depth, x- and y-magnification, tilt, and other effects. Note that in the first path of a multi-path (or phase) rendering, the local graphical parameters 730 only consist of the geometry information from the 3D geometry information extractor function 738, and do not include input from the extractor function 736. The local graphical parameters 730 are fed to the evaluators for text rendering 716.

A set of text visual alteration rules 732 describe how to alter the visual properties of the text based on the local graphical parameters 730. For instance, such rules may select a set of font-types to be used based on the distance from the view position (e.g. if the distance is far, a simpler font-type might be used). Such rules might be provided by the application 700, included in a library, or read from a network or storage device. The text visual alteration rules 732 are also fed to the evaluators for text rendering 716.

The evaluators for text rendering 716 convert fonts represented in vector form into 3D geometry. Such a conversion can be achieved by applying 3D positioning information based on type-font identifiers, font shape, rendering parameters (including 3D geometric information provided through the display list 714), local graphical parameters 730, and the text visual alteration rules 732. The evaluators for text rendering 716 output a set of text triangle(s) 718, which is loaded into the image triangle buffer 710 (along with the non-text triangle(s) 708), and fed to the rasterizer function 720.

In one embodiment of the present invention, a first phase (also referred to as the first path) creates inputs used in the second phase (also referred to as the second path). When the first phase of the data flow reaches the rasterizer function 720, the path specific to the first path (emphasized by dotted arrows in FIG. 7) is taken. The rasterizer function 720 converts the triangle(s) into a set of pixels which are then fed into a local pixel buffer 734. The local pixel buffer 734 in turn feeds the pixel information to an extractor function 736. In one embodiment, the extractor function calculates the red, blue, and green average of the pixels around the rendered text, and then merges this information into the local graphical parameters 730.

In the second phase of the multi-path rendering, the evaluators for the non-text and text rendering functions (706 and 716) make use of the existing (from the first phase) display lists for the non-text and text rendering operations (704 and 714), respectively. As in the first phase, the evaluators for text rendering 716 also take input from the local graphical parameters 730 and the text alteration rules 732. However, in the second phase, the local graphical parameters 730 also include input from the extractor function 736. The evaluators for text rendering 716 use the input from the local graphical parameters 730 and text visual alteration rules 732 to appropriately vary the text triangle(s) 718, for instance by using a variation in the extended type-font or some other mechanism. Note that the evaluator can apply far more detailed rules and alterations to the text triangle(s) based on the additional input provided through the local graphics parameters 730, which now include the data from the extractor function 736, in order to obtain the final text triangle(s) to be displayed.

The generated triangles are fed to the image triangle buffer 710 and then to the rasterizer function 720. The second phase now follows the second path arrow, in which the outputs of the rasterizer function 720 are loaded into a framebuffer 722 that contains the set of pixels that will be displayed on the screen. The framebuffer 722 feeds the pixel data to a digital-to-analog function 724, which finally emits the screen visual image to the image display device 726.

Note that the data flow in FIG. 7 can be implemented in software, general purpose hardware, firmware, semi-specialized hardware, and/or fully-specialized hardware. A specific implementation may depend on commercial considerations, such as product cost, compatibility, through-put and implementation investment. For instance, one implementation may use software for compatibility with pre-existing computers, but may as a result suffer from slow execution. In one embodiment, enhanced software and a pre-existing hardware (e.g. a CPU, cache, and pre-existing specialized digital-to-analog and image display devices) are used to implement the flow in FIG. 7.

A second implementation combines an enhanced graphics and video card with compatible pre-existing computers, and enables much faster display of compensated text. In this implementation, the enhanced video card implements everything in FIG. 7 except for the application 700 and image display device 726, which execute on the pre-existing computer. This enhanced card includes a graphics and video chip that implements each set of evaluators (both for non-text rendering 706 and text rendering 716) and the extractor function 736 as distinct, specialized functional units. This chip also provides a distinct, separate cache for the display list for the text rendering operation 714, the display list for the non-text rendering operation 704, and image triangle buffer 710. Depending on IC fabrication yield, the framebuffer 722 may be another cache on the same IC, or a cache on a separate IC. The digital-to-analog function 724 may also comprise a separate chip, in order to isolate fabrication issues related to mixing digital and analog functionality.

A third, more-advanced implementation contingent upon maturation of IC fabrication may provide faster execution while being smaller, lower-power, and, eventually, lower-cost. In this implementation, a graphics and video chip includes all buffers, functions, and signals shown in FIG. 7, and is mounted directly on the same printed circuit board with the multi-purpose CPU. With sufficient maturation of IC fabrication techniques, these graphics and video units may eventually be included directly on one IC chip along with the multi-purpose CPU(s) and caches.

A fourth implementation favors systems with IC chips that include plural CPUs (e.g. multiple cores that include both a CPU and a cache). Such systems are of particular interest for graphics and video games with a need for enhanced graphics. In such systems, multiple CPUs can implement the main application 700. Separate CPUs in the set of multiple CPUs can manage the non-text rendering operation 702, the evaluators for non-text rendering 706, the text rendering operation 712, the evaluators for text rendering 716, the image triangle buffer 710, the rasterizer function 720, the local pixel buffer 734, and the extractor function 736. Such implementations may combine many advantages of semi-specialized and multi-purpose hardware.

In summary, this invention teaches novel text-rendering techniques that transform words or phases into an appearance that compensates for graphical effects on a virtual 3-D display, thereby improving text readability.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for automated rendering of context-compensated text in a graphical environment that is displayed in a display of a computing device, comprising:
   receiving a specification of items to be graphically displayed in the graphical environment, wherein the specification includes text to be graphically displayed in the graphical environment, and wherein the text is associated with an enhanced type-font for the text;
   determining a set of graphical items that will be displayed in proximity to a graphical representation of the text;
   determining that graphical aspects of the proximate graphical items will interfere with a user's ability to view the graphical representation of the text; and modifying the graphical representation of the text to more clearly display the text in the graphical environment, wherein modifying the graphical representation of the text comprises using rules associated with the enhanced type-font to change the complexity and detail displayed for the graphical representation of the text based on the size of the displayed text.

2. The method of claim 1, wherein determining that graphical aspects of the proximate graphical items will interfere with a user's view of the text includes analyzing one or more of the following:
- a size, a resolution, or a level-of-detail associated with the graphical representation of the text;
- a size, a resolution, or a level-of-detail associated with a proximate graphical item in the graphical environment;
- perspective magnification, tilting, or fog effects related to distance and viewpoint for the proximate graphical item and the graphical representation of the text;
- variations in brightness, color, hue, saturation, virtual lighting, or virtual reflectivity related to the proximate graphical item, the graphical representation of the text, and virtual lighting in the graphical environment; and
- shadows, texture, scattering, absorption, reflections, or other effects related to interactions among the proximate graphical item, the graphical representation of the text, and virtual lighting in the graphical environment.

3. The method of claim 2, wherein modifying the graphical representation of the text involves one or more of the following:
- modifying one or more parameters for the graphical environment;
- modifying one or more parameters associated with the graphical representation of the text;
- changing a typeface for the graphical representation of the text;
- changing a color for the graphical representation of the text based on the appearance of a surface on or near the graphical representation of the text; and
- moving or tilting the graphical representation of the text.

4. The method of claim 3,
- wherein the specification includes the enhanced type-font for the text;
- wherein the enhanced type-font allows a designer to pre-specify a set of type-fonts, font rendering parameters, or visual alteration rules that can be used to modify the graphical representation of the text.

5. The method of claim 1, wherein the method is implemented using one or more of the following: program instructions stored in a memory device, firmware, multi-purpose hardware, semi-specialized hardware, and fully-specialized hardware.

6. The method of claim 1, wherein changing the graphical representation of the text involves removing shadows and serifs for the displayed text when reducing the size of the displayed text.

7. The method of claim 1, wherein changing the graphical representation of the text further comprises:
- replacing portions of the graphical representation of the text by a simplified approximation that
- renders plural characters in the graphical representation of the text differently from individually-rendered characters in the graphical representation of the text and
- graphically emphasizes the most-significant features of the graphical representation of the text when reducing the size of the displayed text.

8. The method of claim 1, wherein modifying the graphical representation of the text comprises changing a color for the graphical representation of the text based on the appearance of a surface on or near the graphical representation of the text by adjusting either a background or a foreground color for the local environment to make the graphical representation of the text more readable.

9. The method of claim 8, wherein changing the color of the graphical representation of the text involves varying the color of a border or edge of the graphical representation of the text to distinguish the graphical representation of the text from the local environment.

10. The method of claim 1, wherein modifying the graphical representation of the text involves:
- representing each character of the text as an object and set of associated transformation techniques instead of as a fixed map;
- wherein representing each character as an object changes the character display process.

11. A computer-readable storage medium storing instructions that when executed by a computer cause the computer to perform a method for automated rendering of context-compensated text in a graphical environment that is displayed in a display of a computing device, the method comprising:
- receiving a specification of items to be graphically displayed in the graphical environment, wherein the specification includes text to be graphically displayed in the graphical environment, and wherein the text is associated with an enhanced type-font for the text;
- determining a set of graphical items that will be displayed in proximity to a graphical representation of the text;
- determining that graphical aspects of the proximate graphical items will interfere with a user's ability to view the graphical representation of the text; and
- modifying the graphical representation of the text to more clearly display the text in the graphical environment, wherein modifying the graphical representation of the text comprises using rules associated with the enhanced type-font to change the complexity and detail displayed for the graphical representation of the text based on the size of the displayed text.

12. The computer-readable storage medium of claim 11, wherein determining that graphical aspects of the proximate graphical items will interfere with a user's view of the text includes analyzing one or more of the following:
- a size, a resolution, or a level-of-detail associated with the graphical representation of the text;
- a size, a resolution, or a level-of-detail associated with a proximate graphical item in the graphical environment;
- perspective magnification, tilting, or fog effects related to distance and viewpoint for the proximate graphical item and the graphical representation of the text;
- variations in brightness, color, hue, saturation, virtual lighting, or virtual reflectivity related to the proximate graphical item, the graphical representation of the text, and virtual lighting in the graphical environment; and
- shadows, texture, scattering, absorption, reflections, or other effects related to interactions among the the proximate graphical item, the graphical representation of the text, and virtual lighting in the graphical environment.

13. The computer-readable storage medium of claim 12, wherein modifying the graphical representation of the text involves one or more of the following:
- modifying one or more parameters for the graphical environment;
- modifying one or more parameters associated with the graphical representation of the text;
- changing a typeface for the graphical representation of the text;

changing a color for the graphical representation of the text based on the appearance of a surface on or near the graphical representation of the text; and moving or tilting the graphical representation of the text.

14. The computer-readable storage medium of claim 13,
wherein the specification includes the enhanced type-font for the text;
wherein the enhanced type-font allows a designer to pre-specify a set of type-fonts, font rendering parameters, or visual alteration rules that can be used to modify the graphical representation of the text.

15. The computer-readable storage medium of claim 11, wherein the method is implemented using one or more of the following: program instructions stored in a memory device, firmware, multi-purpose hardware, semi-specialized hardware, and fully-specialized hardware.

16. The computer-readable storage medium of claim 11, wherein changing the graphical representation of the text involves removing shadows and serifs for the displayed text when reducing the size of the displayed text.

17. The computer-readable storage medium of claim 11, wherein changing the graphical representation further comprises:
replacing portions of the graphical representation of the text by a simplified approximation that
renders plural characters in the graphical representation of the text differently from individually-rendered characters in the graphical representation of the text and
graphically emphasizes the most-significant features of the graphical representation of the text when reducing the size of the displayed text.

18. The computer-readable storage medium of claim 1, wherein modifying the graphical representation of the text comprises changing a color for the graphical representation of the text based on the appearance of a surface on or near the graphical representation of the text by adjusting either a background or a foreground color for the local environment to make the graphical representation of the text more readable.

19. The computer-readable storage medium of claim 18, wherein changing the color of the graphical representation of the text involves varying the color of a border or edge of the graphical representation of the text to distinguish the graphical representation of the text from the local environment.

20. The computer-readable storage medium of claim 11, wherein modifying the graphical representation of the text involves:
representing each character of the text as an object and set of associated transformation techniques instead of as a fixed map;
wherein representing each character as an object changes the character display process.

21. A computing device with a graphics processing unit that renders context-compensated text in a graphical environment that is displayed in a display of the computing device, comprising:
a receiving mechanism configured to receive a specification of items to be graphically displayed in the graphical environment, wherein the specification includes text to be graphically displayed in the graphical environment, and wherein the text is associated with an enhanced type-font for the text;
a determination mechanism configured to determine a set of graphical items that will be displayed in proximity to a graphical representation of the text;
wherein the determination mechanism is further configured to determine that graphical aspects of the proximate graphical items will interfere with a user's ability to view the graphical representation of the text; and
a modification mechanism configured to modify the graphical representation of the text to more clearly display the text in the graphical environment, wherein modifying the graphical representation of the text comprises using rules associated with the enhanced type-font to change the complexity and detail displayed for the graphical representation of the text based on the size of the displayed text.

* * * * *